United States Patent Office 3,304,510
Patented Feb. 14, 1967

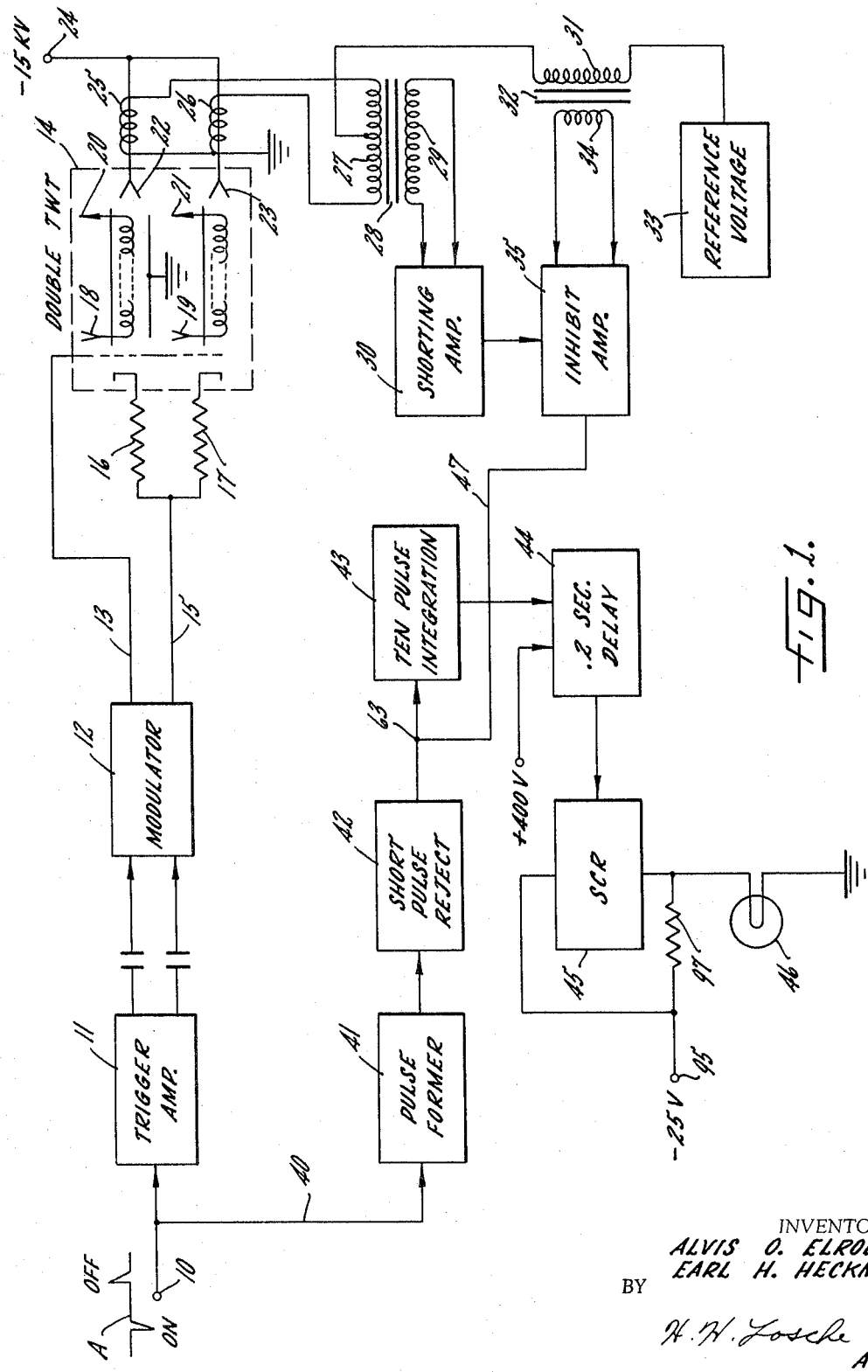

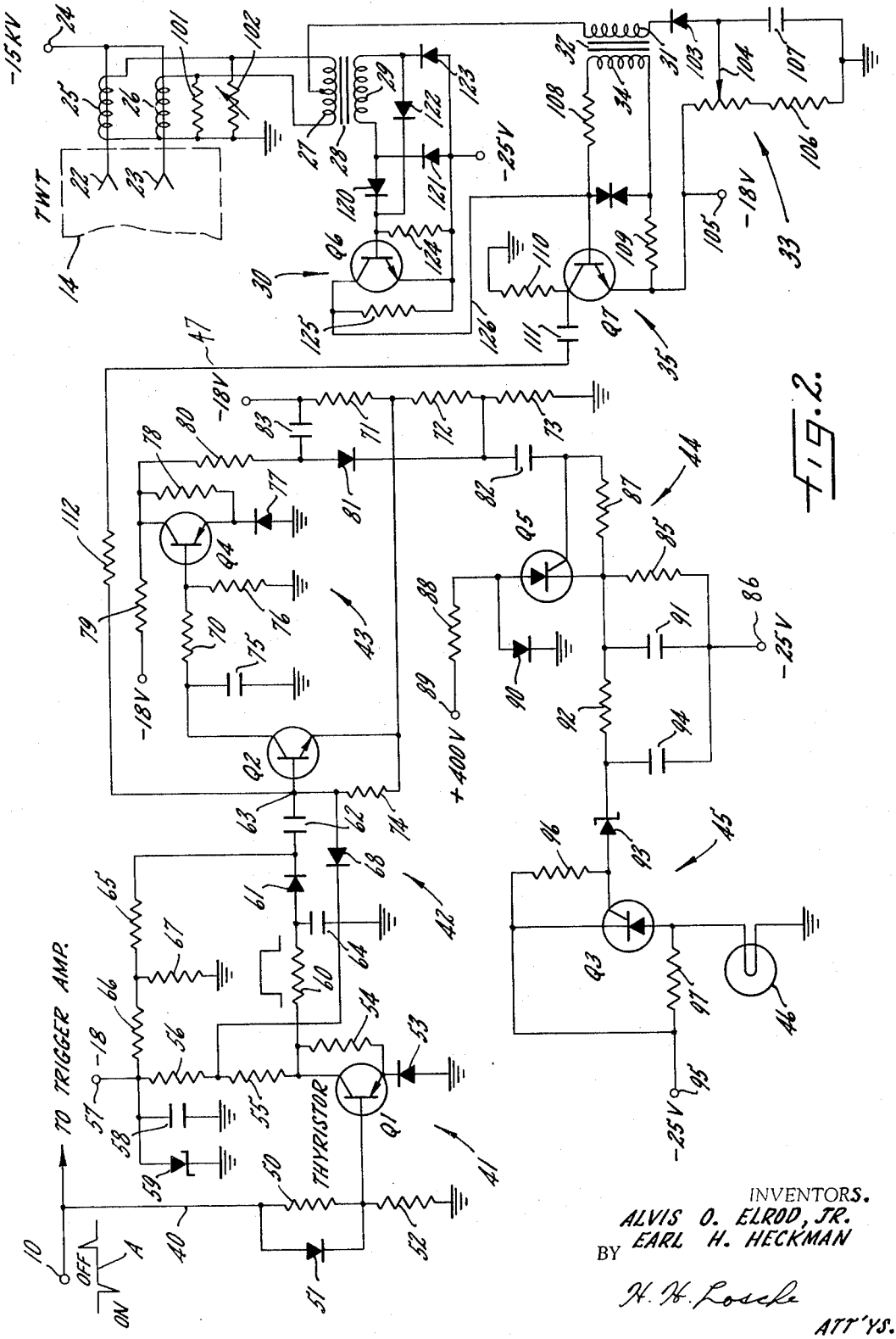

3,304,510
MONITORING CIRCUIT FOR TRANSMITTER POWER AMPLIFIERS
Alvis O. Elrod, Jr., Newark, Ohio, and Earl H. Heckman, Severna Park, Md., assignors, by mesne assignments, to the United States of America as represented by the Secretary of the Navy
Filed Sept. 12, 1963, Ser. No. 308,603
9 Claims. (Cl. 330—2)

This invention relates to a monitoring circuit for radar transmitter power amplifiers for satelilte communication and more particularly to monitoring light circuits for monitoring the operative condition of a pair of grided traveling wave tube power amplifiers of a radar transmitter.

In the use of two radio frequency (RF) inputs and two outputs for two grided traveling wave tubes (TWT) triggered from a single source on the grids thereof through a single modulator, the problem arises as to how the operative condition of the TWT can be monitored to avoid phase shift of the RF signals amplified by the TWT's. If either TWT failed, or if the collector outputs become unequal, it is desirable to monitor this operative condition so that the TWT operation can be corrected and avoid phase shift in the RF signals.

In the persent invention the collector currents of the two TWT's are sampled continuously and any inequality of the collector currents, or a drop in collector currents of both collectors, will provide sample signals which are operative to cause a monitor light to glow indicating the improper TWT operation. Triggering pulses applied in pairs, by first a negative and later a positive pulse, operate through a modulator on the grids of the TWT's to trigger the RF signals amplified in the TWT's. The same trigger pulses are operative through a novel control circuit consisting of a pulse former, a short pulse reject circuit, a ten-pulse integration circuit, and a delay circuit to the control electrode of a silicon controlled rectifier in circuit with a monitor glow lamp. Each pair of opposite polarity pulses on the input to the grid circuit of the TWT's and the control circuit will operate to cause illumination of the monitoring light unless the monitoring light signal is inhibited. The collector outputs of each TWT are transformer coupled through current transformers to the leads of a center tapped primary winding in a second transformer, the secondary winding of which is coupled to a shorting amplifier. The center tap of the second transformer primary winding is coupled through the primary of a third transformer to a reference voltage, the secondary of the third transformer being applied to an inhibit amplifier. The output of the inhibit amplifier is coupled as an input to the ten-pulse integration circuit so that any inhibit signal present will cancel any control signal produced by the pulse former and short pulse reject circuits. If the voltage produced by the current output of the combined TWT collectors is below the reference voltage, no inhibit signal will be produced and the monitoring light will be illuminated by the video control pulse produced from the pair of trigger pulses. If the collector current outputs of the two TWT collectors are unequal, a signal will be produced through the second transformer to the shorting amplifier to cancel any inhibiting pulse produced by the inhibiting amplifier and again the monitor light will be illuminated showing a disorder in the TWT's. If the TWT operatons are proper, a signal will be generated in the secondary of the third transformer producing an inhibit signal which will cancel the video control signal produced by the pulse former from the pair of opposite polarity trigger pulse thereby maintaining the monitoring light in an off or nonilluminating condition. It is therefore a general object of this invention to provide a monitoring circuit for montoring the proper and improper operation of twin, double, or two TWT's used as RF amplifiers for radar satellite communication.

These and other objects and the attendant advantages, features, and uses of this invention will become more apparent to those skilled in the art as the detailed description proceeds and considered along wth the accompanying drawings, in which:

FIGURE 1 is a block and partially schematic circuit diagram of the monitoring circuit of this invention, and FIGURE 2 is a circuit schematic of the monitoring circuit shown in FIGURE 1.

Referring more particularly to FIGURE 1, a radar transmitter power amplifier circuit is shown in which pairs of negative and positive trigger pulses, represented at A, are applied to an input terminal 10 and amplified in a trigger amplifier 11. Trigger amplifier 11 is capacitor coupled to a modulator 12, the output of the modulator 12 being coupled by conductor means 13 in common to both grids of a double or twin TWT 14. A second output of modulator 12 is coupled by conductor 15 in common to the cathodes of the double TWT 14 through resistors 16 and 17, respectively. RF signals are applied to the TWT terminals 18 and 19, respectively, and the outputs of the RF amplified signals are by way of the conductors 20 and 21. Collectors 22 and 23 of the double TWT 14 are coupled in common to a high negative voltage source at terminal 24. The high negative voltage source applied at terminal 24 for the collectors of the TWT's is in the amplitude of −15,000 volts, and so shown in this figure for the purpose of example, although this voltage may be varied in accordance with the type of TWT's used and the purpose desired.

In the conception of this invention it was determined that modulator or TWT failures could be detected by measurement of TWT collector currents. Accordingly, each collector 22 and 23 has a current sensing transformer placed in the circuit thereof such as 25 and 26, respectively. One end of each current sensing transformer secondary is coupled to zero or ground potential while the opposite ends are coupled to opposite leads of a center tapped primary winding 27 of a second transformer 28. The secondary winding 29 of transformer 28 is coupled to a shorting amplifier 30 while the center tap of the primary winding 27 is coupled through a primary winding 31 of a third transformer 32 to a reference voltage source 33. The secondary winding 34 of transformer 32 is coupled to an inhibit amplifier 35.

The trigger input terminal 10 is coupled through a branch conductor 40 to a pulse former circuit 41 which produces an output thereof coextensive in time with the ON and OFF trigger pulses A. This output is applied to a short pulse reject circuit 42, the output of which is applied to a ten-pulse integration circuit 43. Pulses of less than, for example, one microsecond are rejected in the short pulse reject circuit 42 since the rest of the circuit is not accurate for these short pulses. Output pulses from 42 will start the ten-pulse integration circuit 43, the output of which is applied to a .2 second delay circuit 44. After .2 second delay, the pulses from the ten-pulse integration circuit 43 will be applied to a silicon controlled rectifier 45 rendering it conductive to thereby turn on a monitoring light 46. The output of the inhibit amplifier 35 is conducted by conductor means 47 to the ten-pulse integration circuit 42 to cancel any video control pulse formed by the pulse former and therby prevents the monitor light 46 from becoming illuminated. Under this condition of an inhibiting pulse being applied to the circuit 42, the modulator and double TWT are indicated as operating properly. In the absence of an inhibiting signal from the inhibit amplifier 35, the monitor light 46 will become illuminated indicating a fault or improper operation of either the modulator 12 or double TWT 14.

Referring more particularly to FIGURE 2, the trigger input over branch conductor 40 is applied through a parallel circuit including a resistance 50 and diode 51 to the base of a thyristor Q1 in the pulse former circuit 41. The base of thyristor Q1 is also coupled to ground through a biasing resistor 52. The emitter of thyristor Q1 is coupled to ground through a diode 53 and coupled through a resistor 54 to the collector thereof. The collector of Q1 is coupled to a negative voltage source through load resistors 55 and 56 in series. The negative voltage source is applied at terminal 57 and is herein shown for the purpose of example as being —18 volts although other voltages may be used where required or desired. The terminal 57 is coupled to ground through a parallel circuit consisting of a capacitor 58 and a Zener diode 59 to filter out alternating currents and to prevent voltage swings in a positive direction. The collector of thyristor Q1 is also coupled in series through a resistor 60, a diode 61, and a capacitor 62, to a terminal 63 coupled to the base of a transistor Q2. The juncture of the resistor 60 and diode 61 is coupled through a storage capacitor 64 to ground and the juncture of diode 61 and capacitor 62 is coupled through resistors 65 and 66 in series to the negative terminal 57. The juncture of resistors 65 and 66 is coupled through a resistance 67 to ground to place a bias on the cathode of diode 61 and one plate of the capacitor 62. The other plate of capacitor 62, or terminal 63, is coupled through a diode 68 to the juncture of resistors 55 and 56 in the collector circuit of Q1. Whenever a negative pulse of the trigger pulses A is applied to the base of thyristor Q1, this thyristor will be rendered conductive and will remain conductive until the positive pulse of trigger pulses A turns this thyristor Q1 off. The thyristor Q1 is an avalanche transistor which changes from a high impedance state to a low impedance state and remains in this low impedance state until a positive pulse is applied. The resistor diode combination 50, 51 provides the required much higher amplitude pulse of turning off the thyristor Q1. Each pair of ON-OFF trigger pulses A on the base of thyristor Q1 will produce a positive going video pulse on the collector coextensive with the time of the ON-OFF pulses. This video pulse is conducted through the resistor 60, diode 61, and capacitor 62 to the base of transistor Q2 in the ten-pulse integration circuit.

The capacitor 64 in the short pulse reject circuit 42 is charged through the resistor 60. When the pulse reaches the amplitude of the biased diode 61, a pulse is supplied to the base of transistor Q2. If the pulse is shorter than a microsecond, for example, no pulse is supplied since the capacitor 64 has not had time to be sufficiently charged to reach the amplitude of the bias on diode 61. In order for the capacitor 62 to return to its uncharged state in the relatively short interval between pulses, diode 68 coupled to the collector of Q1 will discharge through resistor 56 between pulses. However, during the pulse the drop through resistor 56 is about two volts, for the example of biasing voltages given, and the "short" is removed.

The ten-pulse integration circuit 43 includes transistors Q2 and Q4, the collector of Q2 being coupled through a resistance 70 to the base of Q4. The emitter of Q2 has a negative bias placed thereon from a voltage divider circuit consisting of resistors 71, 72, and 73 between a —18 volt source and ground. The base of transistor Q2 is biased from this same source through a resistor 74. The emitter of transistor Q2 is coupled to one plate of a capacitor 75, the other plate of which is coupled to ground, and the base of transistor Q4 is coupled through a resistor 76 to ground. The emitter of transistor Q4 is coupled to ground through a diode 77 and to the collector through a biasing resistor 78. The collector of Q4 is coupled through a negative voltage source such as —18 volts through a resistor 79. The collector output of transistor Q4 is through a resistor 80, a diode 81, and a capacitor 82, in series, the —18 volt source being applied to one plate of a capacitor 83, the opposite plate of which is coupled to the juncture of resistor 80 and diode 81. The juncture of the diode 81 and capacitor 82 is coupled directly to the juncture of resistors 72 and 73 in the voltage divider circuit. When the transistor Q2 is turned on, as by a video pulse applied from the short pulse reject circuit 42, it charges the capacitor 75. This capacitor discharges through the base of transistor Q4 holding Q4 in conduction from 10 to 20 microseconds, for example, successive pulses at 10 microseconds spacing thus turning transistor Q4 on continuously. The collector output of transistor Q4 charges capacitor 83 through resistance 80. When the charge voltage on capacitor 83 reaches that of biased diode 81, a control signal is applied through the capacitor 82. This operation in the ten-pulse integration circuit 43 takes about 100 microseconds in the example of voltages given and with other values of elements given, infra.

The output of the ten-pulse integration circuit 43 through the diode 81 and capacitor 82 is to the control electrode of a silicon controlled rectifier (SCR) Q5 of the delay circuit 44. The cathode is coupled through a cathode resistor 85 to a negative voltage source terminal 86, herein shown for example as being —25 volts. The control electrode and cathode of the SCR Q5 are coupled through a resistor 87. The anode of the SCR Q5 is coupled through an anode load resistor 88 to a terminal 89 to which may be applied a positive voltage, shown herein as 400 volts for the purpose of example. The anode is also coupled to ground through a diode 90, this diode 90 being used in a unique fashion preventing the anode of SCR Q5 from going above ground potential so that a 30 volt SCR can be used in what otherwise would be a 425 volt circuit. The cathode resistor 85 is paralleled by a capacitor 91, and the cathode output of SCR Q5 is through a resistor 92 and a Zener diode 93 in series to the SCR monitor light circuit 45. The juncture of the resistor 92 and Zener diode 93 is coupled to one plate of a capacitor 94, the opposite plate of which is coupled to the negative voltage source 86. Although resistor 85 gives the SCR Q5 the appearance of being a cathode follower, capacitor 91 bypasses the resistance for the trigger. Once triggered, the SCR Q5, like the thyristor Q1, stays in conduction until the current drops below the holding current. Charging current conducted through the resistors 88 and 92 charge capacitors 91 and 94 in about .2 second time constant. At any time prior to that, interruption of the 400 volt positive supply will turn off SCR Q5. 400 volts are used since this supply is used elsewhere in the circuits and is interrupted within .2 second after the high voltage source supply is interrupted. This prevents the monitor light from turning on in this case. When the capacitor 94 charges to above —15 volts as determined by the Zener diode 93, a signal will be applied through the Zener diode to the circuit 45.

The monitor light circuit 45 consists of an SCR Q3 having the anode of the Zener diode 93 coupled to the control terminal thereof. The cathode of Q3 is coupled directly to a negative voltage source from terminal 95 and is coupled to the control electrode through a biasing resistor 96. The anode of Q3 is coupled to the negative voltage source 95 through an anode voltage resistor 97 and the anode of Q3 is likewise coupled through the monitor light 46 to ground. Whenever a signal is applied through the Zener diode 93 from the delay circuit 44 to the control terminal of SCR Q3, this SCR will become conductive at which time the monitor light 46 will glow. The circuit described above will produce glow or illumination of the monitor light 46 for any occurrence of the paired positive and negative trigger pulses A shown to be applied at terminal 10, unless an inhibit signal is applied to terminal 63.

Inhibit signals are produced on the output of the inhibit amplifier 35 whenever the twin or double TWT 14 is in proper operation. The current transformers 25 and 26 each has resistors 101 and 102, respectively, in parallel therewith, the resistor 102 being variable to compensate for any inequalities in the current transformer secondaries. The center tap of the primary winding 27 of the second transformer 28 is coupled through the primary winding 31 of the third transformer 32 and through a diode 103 to the adjustable tap 104 of a potentiometer constituting the reference voltage 33 resulting from a negative voltage applied at terminal 105 and across the potentiometer and a resistor 106 to ground potential. The terminal 105 is shown for the purpose of example, as being supplied −18 volts although other voltages may be used where they are desirable. The adjustable tap 104 of the potentiometer is coupled to one plate of a capacitor 107, the opposite plate being coupled to ground. The secondary winding 34 has one lead coupled through a resistor 108 to the base of a transistor Q7 while the other lead of secondary winding 34 is coupled through a resistor 109 to the emitter of transistor Q7. The base of transistor Q7 is coupled through a pair of diodes in cathode back-to-back relation to the junction of the secondary winding 34 and resistor 109 to apply only positive pulses to the base of Q7 when pulses are generated in the secondary 34. The collector of transistor Q7 is coupled through a collector biasing resistor 110 to ground and also through a capacitor 111 and a resistor 112 in series to the terminal 63 at the input of the ten-pulse integration circuit 43. Whenever the current outputs combined on the collectors 22 and 23 of the double TWT 14 are sufficient to show proper operation of the TWT, a signal will be produced from the center tap of the primary winding 27 of the second transformer 28 through the primary winding 31 of the third transformer 32. If the TWT collector currents average to produce a voltage above the reference voltage set by the potentiometer tap 104, a positive pulse is applied from the secondary winding 34 to the base of transistor Q7 thereby producing a negative pulse on the collector output of Q7 through the capacitors 111 and 112 to terminal 63 cancelling the positive pulse coming as an output of the short pulse reject circuit 42. The video control pulse coming from the pulse former 41 and short pulse reject circuit 42 is thereby canceled and the monitor light 46 will remain extinguished. If the TWT collector currents average to produce a voltage below the reference voltage set by the potentiometer adjustable tap 104, no positive pulse will be generated to turn transistor Q7 on whereupon no inhibit pulse will be developed. The control pulse coming from the pulse former 41 and short pulse reject circuit 42 will be applied to the ten-pulse integration circuit which will be conducted through the delay circuit 44 turning on the monitor circuit 45 to illuminate the monitor light 46 showing a malfunction of the double TWT 14 or the modulator 12 preceding.

The shorting amplifier circuit 30, when rendered conductive will produce negative voltage signals which are applied from the −25 v. source, as shown, to the base of transistor Q7 in the inhibit amplifier 35 to prevent an inhibit positive signal from being developed when there are unequal currents in the two collector outputs 22 and 23 of the double TWT 14. This, in effect, shorts out inhibit amplifier 35. The secondary winding 29 of the second transformer 28 is coupled through a rectifying circuit consisting of four diodes 120, 121, 122, and 123 to the base of a transistor Q6. Diodes 120 through 123 convert signals from the secondary winding 29 to a positive pulse regardless of the direction of the current in the secondary winding 29 providing it exceeds breakdown voltage of the diodes. The base of transistor Q6 is coupled through a resistor 124 to the emitter thereof and the emitter is coupled through a resistor 125 to the collector thereof. The collector of transistor Q6 is coupled by way of conductor 126 to the base of transistor Q7 of the inhibit amplifier 35. Consequently, whenever there is a mismatch of currents in collector outputs 22 and 23, a positive pulse will be applied to the base of transistor Q6 which will develop a negative pulse on the collector output to apply this negative pulse to the base of transistor Q7 preventing it from going into conduction and thereby preventing Q7 from producing an inhibit signal. Thus the monitor light 46 will glow indicating improper operation of the double TWT 14.

In order to provide one operative example, as referred to hereinabove, values will be given to the elements shown and described although the invention is not in any way limited to these values, listed in the following:

*Semiconductors*

| | |
|---|---|
| Q1 | 2N1213 |
| Q2 | 2N1306 |
| Q3 | 2N1881 |
| Q4, Q7 | 2N1307 |
| Q5 | 2N885 |
| Q6 | 2N706 |

*Resistors (in ohms)*

| | |
|---|---|
| 50, 52, 65 | 2.2K |
| 54, 78 | 100K |
| 55 | 1500 |
| 56 | 220 |
| 60, 80, 110, 112 | 4.7K |
| 66, 79, 85, 106 | 10K |
| 67, 70, 73, 125 | 22K |
| 71 | 180 |
| 72 | 15K |
| 74, 76, 96, 108, 109, 124 | 1000 |
| 87, 92 | 3.9K |
| 88 | 220K |
| 97 | 750 |
| 101 | 2050 |
| 102 | 2K |
| 104 | 20K |
| 106 | 10K |

*Capacitors*

| | | |
|---|---|---|
| 58 | µf | 6.8 |
| 62 | µµf | 680 |
| 64 | µµf | 390 |
| 75 | µµf | 620 |
| 82, 111 | µf | .01 |
| 83 | µf | .033 |
| 91, 107 | µf | 10 |
| 94 | µf | 27 |

OPERATION

While the operation of the device may be understood from the preceding detailed description of the several circuits in cooperation, a more general statement of operation will be given herein for clarity. Let it be assumed that the double TWT 14 and modulator 12 are operating properly to amplify RF signals at the outputs 20 and 21 of the double TWT 14. In this case collector currents from 22 and 23 will be equal and sufficient thereby providing no secondary output on the secondary winding 29 of the second transformer 28. A signal from the secondary winding 34 is produced since the combined currents of the TWT collectors produce a voltage that exceeds the reference voltage at 104. Accordingly, the shorting amplifier circuit 30 will be made dormant and the pulse produced in the secondary 34 of the third transformer 32 will place transistor Q7 into conduction to generate a negative pulse on the collector output thereof which is applied to terminal 63 canceling the control video signal pulse developed by the pulse former 41. Since the inhibit signal generated from the inhibit amplifier circuit 35 cancels the video control signal formed by the pulse former 41, the SCR's Q3 and Q5 remain unenergized and the monitor signal light 46 will remain extinguished.

If the collector currents from collectors 22 and 23 of the double TWT 14 are low, but equal, to produce a low voltage, the output through the current transformers 25 and 26 and the center tap of the primary winding 27 of the second transformer 28 will be below the value set by the voltage reference at 104 so that no signal will be produced on the secondary winding 34 and, therefore, no inhibit signal will be generated by the inhibit amplifier circuit 35 to inhibit the control signal produced through the pulse former circuit 41. Accordingly, the circuit components 41, 42, 43, 44, and 45 will become operative to cause the monitor signal light 46 to glow. Also, since the collector currents from 22 and 23 in the double TWT 14 were equal, no signal will be generated in the secondary winding 29 of this second transformer 28 whereby transistor Q6 will remain nonconductive.

If, on the other hand, the current outputs of the two collectors 22 and 23 become unequal, signals of either phase, depending on which winding 25 or 26 produces the greater current, will produce a signal in the secondary winding 29 which will be rectified to produce a positive pulse on the base of transistor Q6 of the shorting amplifier circuit 30. The collector output of transistor Q6 will be negative pulse applied by way of conductor 126 to the base of transistor Q7 blocking conduction thereof although a signal may have been developed in the secondary winding 34 of the third transformer 32 where the combined current outputs of the collectors 22 and 23 were sufficient to produce a voltage to exceed the reference voltage set by the potentiometer 104. As heretofore stated, this blocks the possible conduction of transistor Q7 in the inhibit amplifier circuit 35 so that no inhibit signal is developed. The control video signal coming by way of the components 41, 42, 43, and 44 will cause the SCR Q3 to be conductive and illuminate the monitor light 46 indicating a fault in the double TWT 14. It may be realized that a fault in the operation of the double TWT 14 may be caused by the modulator 12 preceding it which will give the results in the double TWT 14 to prevent the generation of an inhibit signal in the manner heretofore stated. Thus the monitor circuit will provide a signal light indication of faults occurring in the doublt TWT 14 or modulator circuit preceding it.

While many modifications and changes may be made in the constructional details and features of this invention or in changes of voltages applied or values of resistor and capacitor elements to meet certain applications different from the example given herein, it is to be understood that we desire to be limited in the spirit and scope of our invention only by the scope of the appended claims.

We claim:

1. A monitoring circuit for traveling wave tube power amplifiers comprising:
    an input for trigger pulses;
    a monitor signal light and a semiconductor switch in circuit with a voltage supply, said switch having a control electrode therefor;
    a pulse former circuit, a short pulse reject circuit, a ten-pulse integrator circuit, and a delay circuit coupled in series from said input to said control electrode of said semiconductor switch to produce a control signal to control said semiconductor switch to energize said monitor signal light;
    traveling wave tubes, having the cathodes, grids, and collectors coupled in common and each having the collector output with a current sensing means associated therewith to sense the amount of current flow in each collector, said commonly coupled grids coupled to receive said signal pulses from said input;
    inhibit circuit means coupled to said current sensing means as an input thereto and to said ten-pulse integration circuit as an output therefrom to produce an inhibit signal when said current sensing means senses proper and equal current flow in each collector output applied to said ten-pulse integrator to inhibit said control signal from energizing said monitor light and to produce no inhibit signal when said current sensing means senses improper low and unequal current flow in the collector outputs whereby operation of said traveling wave tubes is monitored.

2. A monitoring circuit as set forth in claim 1 wherein said current sensing means on said collector outputs of said traveling wave tubes are transformers.

3. A monitoring circuit as set forth in claim 2 wherein said traveling wave tubes comprise two, and
    said inhibit circuit means includes a second transformer having a center-tapped primary with the primary leads coupled one each to said current sensing transformers and with the center-tap coupled through the primary of a third transformer to a reference voltage source, the secondary of said second transformer being coupled to a shorting amplifier, and the secondary of said third transformer being coupled to an inhibit amplifier with a second input thereto from said shorting amplifier, said output to said ten-pulse integrator being from said inhibit amplifier whereby proper operation of said traveling wave tubes will produce a signal through the center-tap of said second transformer and through said third transformer to produce an inhibit signal on the output of said inhibit amplifier and whereby improper operation of said traveling wave tubes will produce unequal signals in the two half primary portions of said center-tapped primary winding to produce a signal operative in said shorting amplifier to disable said inhibit amplifier from producing an inhibit signal.

4. A monitoring circuit as set forth in claim 3 wherein said semiconductor switch is a silicon controlled rectifier having its control electrode coupled to said delay circuit through a Zener diode.

5. A monitoring circuit for traveling wave tube power amplifiers of trigger signals modulated and applied to the grids of two traveling wave tubes amplifying radio frequency signals on the collector outputs thereof, the invention which comprises:
    an input for receiving negative and positive trigger pulses in sequence of paired negative and positive pulses;
    a monitor signal light and a silicon controlled rectifier in circuit with a voltage source, said rectifier having a control electrode;
    a pulse former circuit, a short pulse reject circuit, a ten-pulse integration circuit, and a delay circuit coupled in series from said trigger pulse input to said rectifier control electrode to produce a positive control signal for each pair of negative and positive trigger pulses to control said silicon controlled rectifier into conduction to energize said monitor signal light;
    current sensing means associated with each traveling wave tube collector output to sense the amount of current flow in each collector, each current sensing means being coupled to opposite leads of a center-tapped primary winding of a second transformer, the secondary winding of which is coupled through rectifying means to an amplifier to produce a signal on an output thereof; and
    an inhibiting amplifier circuit having a first input coupled through a third transformer to the center tap of said second transformer primary winding and a second input coupled to said amplifier output and having an output coupled to said ten-pulse integration circuit to produce a negative inhibit signal thereon, said first input being coupled to a voltage reference whereby equal outputs of said traveling wave tube collectors will be operative through said current sensing means and said third transformer to said inhibit amplifier circuit to direct a negative signal to said ten-pulse integration circuit to inhibit said positive control signal from said ten-pulse integration circuit and whereby unequal outputs of said traveling wave tube collectors will be operative through said amplifier to condition said inhibit amplifier circuit to produce no inhibit signal to allow said positive control signal to render said silicon controlled rectifier conductive to energize said monitor light.

6. A monitoring circuit as set forth in claim 5 wherein said current sensing means are first transformers having the primaries of each in circuit with each collector output and said secondaries coupled to said opposite leads of said second transformer primary.

7. A monitoring circuit as set forth in claim 6 wherein said pulse former circuit, said ten-pulse integrator circuit, and said delay circuit are each transistor circuits.

8. A monitoring circuit as set forth in claim 7 wherein said rectifying means comprise four diodes constructed and arranged to apply unidirectional current to said amplifier from bidirectional current of said second transformer secondary.

9. A monitoring circuit as set forth in claim 8 wherein said silicon controlled rectifier in said circuit with said monitor light has an anode coupled to a positive voltage source and to the anode of a diode and the cathode coupled to a negative voltage, the cathode of the diode being coupled to ground to prevent the silicon controlled rectifier from exceeding zero voltage in the positive direction.

No references cited.

ROY LAKE, *Primary Examiner.*

N. KAUFMAN, *Assistant Examiner.*